US012617135B2

(12) United States Patent
Finke et al.

(10) Patent No.: US 12,617,135 B2
(45) Date of Patent: May 5, 2026

(54) METHOD FOR PRODUCING A MEDIA-TIGHT MATERIAL COMPOSITE

(71) Applicant: Franz Binder GmbH + Co. Elektrische Bauelemente KG, Neckarsulm (DE)

(72) Inventors: Hans Michael Finke, Elztal-Auerbach (DE); Andreas Armin Neuner, Bad Rappenau (DE)

(73) Assignee: Franz Binder GmbH + Co. Elektrische Bauelemente KG, Neckarsulm (DE)

( * ) Notice: Subject to any disclaimer, the term of this patent is extended or adjusted under 35 U.S.C. 154(b) by 655 days.

(21) Appl. No.: 17/764,661

(22) PCT Filed: Sep. 30, 2020

(86) PCT No.: PCT/DE2020/200081
§ 371 (c)(1),
(2) Date: Mar. 29, 2022

(87) PCT Pub. No.: WO2021/063456
PCT Pub. Date: Apr. 8, 2021

(65) Prior Publication Data
US 2022/0347901 A1     Nov. 3, 2022

(30) Foreign Application Priority Data

Sep. 30, 2019    (DE) ..................... 10 2019 215 065.9

(51) Int. Cl.
B29C 45/14          (2006.01)
B29C 67/04          (2017.01)
(Continued)

(52) U.S. Cl.
CPC ........ B29C 45/14639 (2013.01); B29C 67/04 (2013.01); B29C 70/683 (2013.01);
(Continued)

(58) Field of Classification Search
CPC ................ B29C 45/14639; B29C 2045/14877
See application file for complete search history.

(56) References Cited

U.S. PATENT DOCUMENTS 5,426,166 A * 6/1995 Usifer ................. C08F 290/067
526/301
5,641,307 A      6/1997 Gerrans
(Continued)

FOREIGN PATENT DOCUMENTS

CN          101450519 A      6/2009
CN          203273694 U      11/2013
(Continued)

OTHER PUBLICATIONS

International Search Report for Application No. PCT/DE2020/200081, mailed Mar. 16, 2021, 3 pgs.
(Continued)

*Primary Examiner* — Edmund H Lee
(74) *Attorney, Agent, or Firm* — Seed Intellectual Property Law Group LLP

(57) ABSTRACT

A method for producing a media-tight material composite, in particular comprising a metal solid body and an optionally electrically insulating plastic at least partially surrounding the solid body, preferably as a component of a preferably shielded electrical interface, wherein surfaces of the solid body that the plastic contacts are subjected to a surface pretreatment in order to promote the adhesion of the plastic to the solid body. The disclosure further relates to a cylindrical metal sleeve, in particular as part of a plug connector, and a plug connector or sensory comprising a metal sleeve, produced by the foregoing method.

12 Claims, 3 Drawing Sheets

(51) Int. Cl.
  *B29C 70/68* (2006.01)
  *B29K 705/00* (2006.01)
  *B29L 31/36* (2006.01)
(52) U.S. Cl.
  CPC .............. *B29C 2045/14868* (2013.01); *B29K 2705/00* (2013.01); *B29K 2995/0007* (2013.01); *B29L 2031/36* (2013.01)

(56) References Cited

U.S. PATENT DOCUMENTS

| | | |
|---|---|---|
| 6,565,790 B2 | 5/2003 | Lindner et al. |
| 2006/0157725 A1 | 7/2006 | Flaherty |

FOREIGN PATENT DOCUMENTS

| | | |
|---|---|---|
| CN | 103950147 A | 7/2014 |
| CN | 107650325 A | 2/2018 |
| DE | 4444716 | * 7/1998 |
| DE | 10 2006 002 539 A1 | 8/2006 |
| DE | 10 2009 052 088 A1 | 5/2011 |
| EP | 1 172 193 A1 | 1/2002 |
| EP | 3189867 | * 7/2017 |
| JP | H0570560 | * 3/1993 |
| JP | H11348173 | * 12/1999 |
| JP | 2005212446 | * 8/2005 |
| JP | 2007098943 | * 4/2007 |
| JP | 2019-119093 A | 7/2019 |
| WO | WO2016199100 | * 12/2016 |
| WO | 2019/048325 A1 | 3/2019 |

OTHER PUBLICATIONS

International Preliminary Report on Patentability and Written Opinion for Application No. PCT/DE2020/200081, mailed Apr. 5, 2022, 18 pgs.

* cited by examiner

METHOD FOR PRODUCING A MEDIA-TIGHT MATERIAL COMPOSITE

BACKGROUND

Technical Field

The disclosure relates to a method for producing a media-tight material composite, in particular a media-tight arrangement of a solid body surrounded by plastic, and further in particular, an electrical plug connector that is preferably shielded. Furthermore, the disclosure relates to a preferably cylindrical metallic sleeve, in particular, as a component of a plug connector. Finally, the disclosure relates to a plug connector or sensor, comprising a metallic sleeve.

Description of the Related Art

Numerous applications are available for use in encapsulated plugs, of which the sensor region and/or the outdoor region are merely referenced by way of example. In accordance with the specific field of application, high demands are placed on the tightness of such plugs. This is referred to as the need for a media-tight encapsulation. Depending upon the protection class—in particular, with IP67, IP68 or IP69K—the encapsulation can be the last operation before completion. In the case of a leak, the entire previous added value becomes worthless, and an encapsulated plug, for example, becomes a reject. In the case of external application (outdoor plug, HEC), tightness is even more important, and increased demands on the materials and/or material composites ensue. This may be the need for increased tightness, e.g., protection class IPX7, IPX8, or IPX9k, so that the media-tight material composite is sufficiently protected even in the case of high-pressure/steam-jet cleaning. Furthermore, there may be increased demands with respect to maximum weather resistance—for example, against UV irradiation and/or sprinkling.

It is known from practice that media-tight encapsulations can be realized well for freshly-molded parts. However, if the parts age, gaps are formed due to shrinkage in the boundary layer between, for example, a metallic sleeve and the encapsulation. Due to a hygroscopic effect, moisture penetrates the component through the gap.

In addition to the aging processes, different coefficients of expansion of the metal and of the encapsulation material, which are usually made of plastic, are responsible for the formation of cracks. Further important influencing criteria are the materials or their combination, the component geometries, the production method, the tool design, and the corresponding process management. Material factors in the failure of media-tight material composites are the formation of gaps and the occurrence of micro cracks in the plastic component, which are substantially attributable to a lack of adhesion between the metal and plastic components, but also to mechanical solidification stresses.

BRIEF SUMMARY AND GENERAL DESCRIPTION

The present disclosure specifies a method according to which regions surrounded by plastic are media-tight over a long period of time as well.

This should apply, in particular, to the interfaces between the usually metallic component and the plastic, in particular as a component of a plug connector. Preferably, crack-free and gap-free encapsulation and improved adhesion of the metal-plastic compound are to be realized. Finally, a corresponding interface having a metal sleeve surrounded by plastic is to be specified, which is produced by the method according to the disclosure.

It should be noted at this juncture that the solid body or the metal part can be surrounded by plastic by means of different methods. An injection molding process is mentioned below merely by way of example, without being limited thereto.

According to the disclosure, a media-tight plastic coating is produced around a solid body, and in particular around components of a preferably shielded electrical plug, which can be a component of a sensor, for example. According to the disclosure, surfaces of the components contacted by the plastic are pretreated to promote the adhesion of the plastic to the components.

The disclosure is based upon the idea of establishing, during the manufacturing process, an improvement in the wetting between the metal part and the plastic, which results from an optimization of interface energy in relation to the surface energies or surface tensions of the respective components. Ultimately, this involves optimizing the contact angle during wetting.

Due to sufficiently good adhesion, the gap formation between the metal surface and the plastic is effectively minimized/avoided even over longer use, and even where the components have different coefficients of expansion. The is advantageous for the product in that the media-tight material composite becomes much more robust. As a result, sufficient tightness can also be ensured under adverse conditions.

According to one embodiment, the solid body is encapsulated with plastic, for example, with polyurethane. Encapsulation takes place after pretreatment, and in particular directly after pretreatment. Since the result of the encapsulation is strongly dependent upon the adhesion/cleanliness of the plastic on the solid body, a short period of time between pretreatment and encapsulation is advantageous.

The solid body can generally be inserts. For example, it may also be a housing or a solder layer around a plug connector, which is preferably produced by means of integrated metal-plastic injection molding, or "IMPIM." The encapsulation of such structures can also be significantly improved by the pretreatment.

The effect of the pretreatment can also be increased by maximizing the interlocking of the plug sleeve and plastic encapsulation. For example, sand blasting, laser structuring, and in particular nanoscale sculpturing, are specified for this purpose.

As an alternative to encapsulation, the solid body may also be cast in plastic or encased by sintering with plastic. As a result of the pretreatment, the adhesion can also be optimized here, and the formation of gaps and/or cracks can be reduced.

The solid body is, advantageously, a sleeve, or the arrangement comprises a sleeve, wherein said sleeve can be cylindrical. The plug accordingly comprises a plug sleeve. Said plug sleeve can be at least partially in direct contact with the plastic via a contact region, wherein the contact region can be pretreated.

The pretreatment of the plug sleeve can be a mechanical and/or chemical and/or physical pretreatment. It can be important here that the process of pretreatment favor the adhesion between the metal and the plastic material.

The pretreatment also brings about a significant improvement in tightness when already comprising an optimization of the geometry or similar structural measures, e.g., a provision of one or more circumferential grooves as a labyrinth for the medium, the penetration of which is to be avoided. The pretreatment also achieves significant improvements in combination with another geometric configuration or further components. For example, a shrink hose is mentioned, which is applied to the metallic solid body before encapsulation, or an O-ring, which has been introduced into a groove of the metallic solid body, before this structure is then encapsulated.

The pretreatment replaces various processes with respect to the optimization of the wetting, in particular the adhesion promoters/primers usually used, which are specifically adapted to the encapsulation material used, and further in particular, to polyurethane as an encapsulation material.

A further additional variant of the pretreatment can take place within the scope of a process optimization, for example, in the form of preheating the titanium dioxide-coated, metallic solid body before encapsulation.

The pretreatment is based upon the method of photocatalysis and can, by means of UV irradiation, comprise the cleaning of the surface due to the photocatalytic self-cleaning and the formation of a water layer. In this way, hydrophilization of the surface can be realized.

Preferably, the coated sleeve of a pre-mounted interface, in particular, a sensor, can be activated by UV irradiation. UV surface cleaning and/or activation with oxygen or ozone as a reaction partner is also conceivable and can lead to optimized wetting of the surfaces. In contrast to chemical method solutions, such as, for example, the use of primers, no health hazards are to be expected during production with UV irradiation. The parts can already be supplied as coated, preferably with a layer consisting of titanium dioxide-based nanoparticles. Therefore, it is not necessary, for example, to provide suction devices or the like in production, thereby keeping investment costs low. The manual/by-hand processing, which is customary today, can therefore be continued unchanged. Any organic residues on the sleeve, which are very harmful during encapsulation, can be removed without leaving any residues only by use of photocatalytic cleaning.

The aim of the pretreatment is an improvement in the wetting between the surface of the encased component and the encasing, resulting from an optimization of, and in particular reduction in, the interface energy in the interface of the component to be encased and the material of the encasing relative to the sum of the surface energies or surface tensions of the surface of the material to be encased and the encasing. In particular, a contact angle between a surface of the component to be encased, for example a metallic surface, and the plastic used for the encasing can thereby be reduced.

With regard to the encased metallic sleeve, it is important for said sleeve to be a component of a plug connector or a sensor. The construct made of metallic sleeve and encasing is carried out according to a method having features as previously discussed.

The same applies to a sensor (interface) according to the disclosure, which can comprise an encased metallic sleeve, in particular a plug connector according to the preceding embodiments.

In light of the above statements, it becomes clear that the wetting described above is not the only thing improved by the UV irradiation. In fact, a cleaning effect is achieved as a result of photocatalytic combustion.

The surface pretreated in this way makes it possible for a sufficiently good adhesion to ensue between the metal surface and the encasing material after the encasing. The sleeve can be treated from the outside and/or from the inside.

The activation by UV light can also take place from the inside and/or from the outside.

The encasing method used can be the so-called hot-spraying method within the context of a plastic injection molding process. Casting and sintering are also possible, depending upon requirements.

The pre-treatment further ensures that production runs easily, robustly, and at the same time highly reliably, and that waste is reduced significantly. In terms of manufacturing technology, it is advantageous if the method can be implemented in the manufacturing process, viz., in an existing manufacturing/assembly process. It is imperative to ensure that the cycle time is not reduced. The exposure time required for activation by UV light can be selected to be smaller than the production cycle, so that output is not reduced.

In addition, the method involves no further costs relating to occupational health and safety measures in production. The method can be implemented quite easily in an existing production process. Supplied metal parts, in particular, metallic solid bodies in the form of bulk material which is delivered by external suppliers, can be mounted as usual. Before the actual encapsulation, UV irradiation can take place inline. A through-hole in the sleeve is helpful in order to also ensure irradiation in the critical inner portion (bending) of the sleeve. UV irradiation requires less than 100 seconds. Even longer irradiation times are not detrimental to activation, but are not desirable for technical production reasons. It is thus possible to check, if necessary, whether the pretreatment has developed the desired effect. Thereafter, the solid body, also called the injection-molded part, can be placed into the injection-molding tool and encapsulated, and then set aside. This process is repeated with the UV irradiation of the next injection-molded part and the corresponding insertion.

Since no extraction or disposal of any kind is required, as is the case with primers (conventional adhesion promoters) for example, some of which are highly toxic, the method is also more environmentally friendly. The application of the titanium dioxide layer at the supplier's is also environmentally friendly.

There are also requirements to the effect that the storage capability of correspondingly manufactured components must be two years and more, without the need to take special protective measures with respect to storage and transport. This means that the efficacy of the pretreatment, and ultimately the adhesion between the components, is maintained during the aforementioned period. An important element of the component qualification is the maximum permissible storage period, without loss of function or without visual changes. In known methods, the activation of metals is usually very unstable and thus greatly limited in terms of time. It has been shown that activation by means of UV illumination can fully reproduce and repeatedly restore the effect of photocatalytic self-cleaning. The technical agents preferably comply with the EU guidelines, RoHS "Restriction of [the use of specific] Hazardous Substances" and REACH—"Registration, Evaluation, Authorization and Restriction of Chemicals."

BRIEF DESCRIPTION OF THE SEVERAL VIEWS OF THE DRAWINGS

There are various possibilities for designing and developing the teaching of the present disclosure in an advantageous manner. To this end, reference is made, on one hand, to the claims and, on the other, to the subsequent explanation of a preferred exemplary embodiment of the disclosure by means of the drawings. Generally preferred designs and developments of the teaching are also explained in conjunction with the explanation of the preferred exemplary embodiments of the disclosure with reference to the drawings. Shown in the drawings are the following:

DETAILED DESCRIPTION

Figure 1:
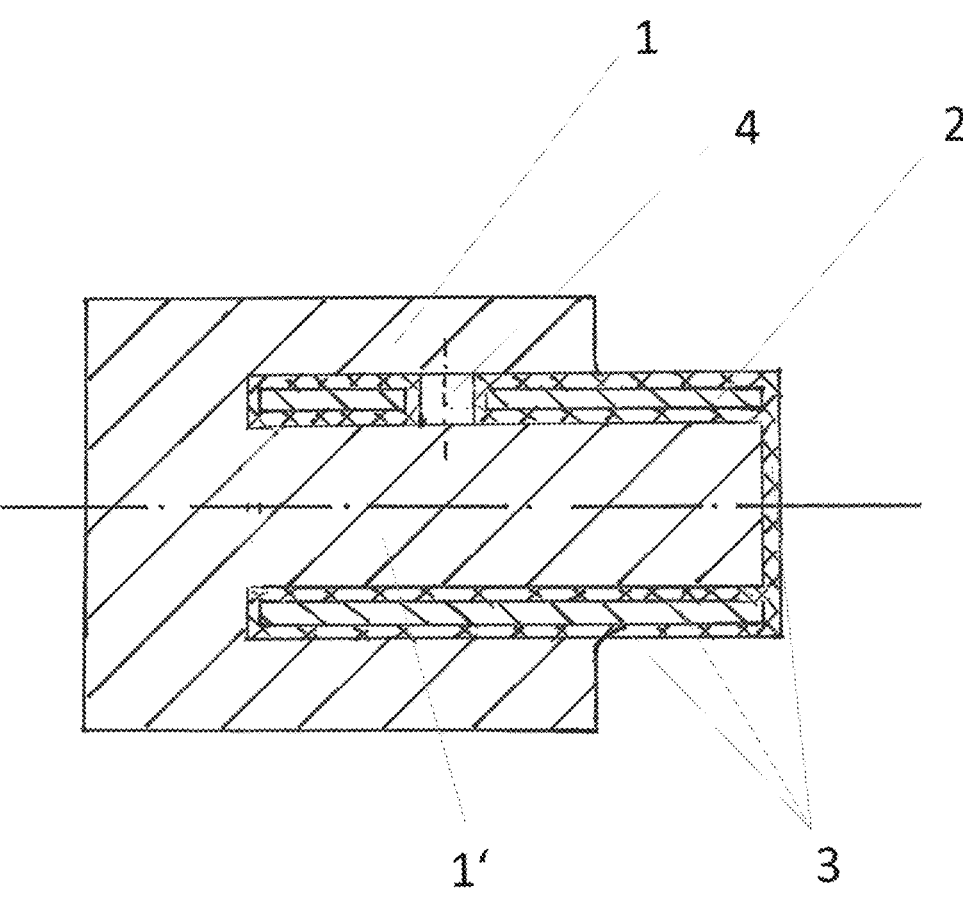
FIG. 1 shows a schematic representation of an exemplary embodiment of a plug connector encased in plastic.

The figures, beginning with FIG. 1, together show a plug connector which is, for example, encapsulated in plastic, comprising an insulating encapsulation 1 made of plastic—optionally, a casting compound—and a molding 1' in the interior of a sleeve 2, which has a metallic surface 3. The sleeve consists of metal and is completely encased by the surface 3, which has photocatalytic properties. For this purpose, the surface 3 is photocatalytically treated over the entire region of the sleeve 2, i.e., on the outside and inside, and thus coated with titanium dioxide, for example, thereby improving the wettability by plastic. The surface 3 can be applied, for example, in a dipping method or in another known manner. The adhesion of the injection-molded plastic of the encapsulation 1 on the surface 3, and also in the region of a through-hole 4 in the sleeve 2, is promoted.

Figure 2:
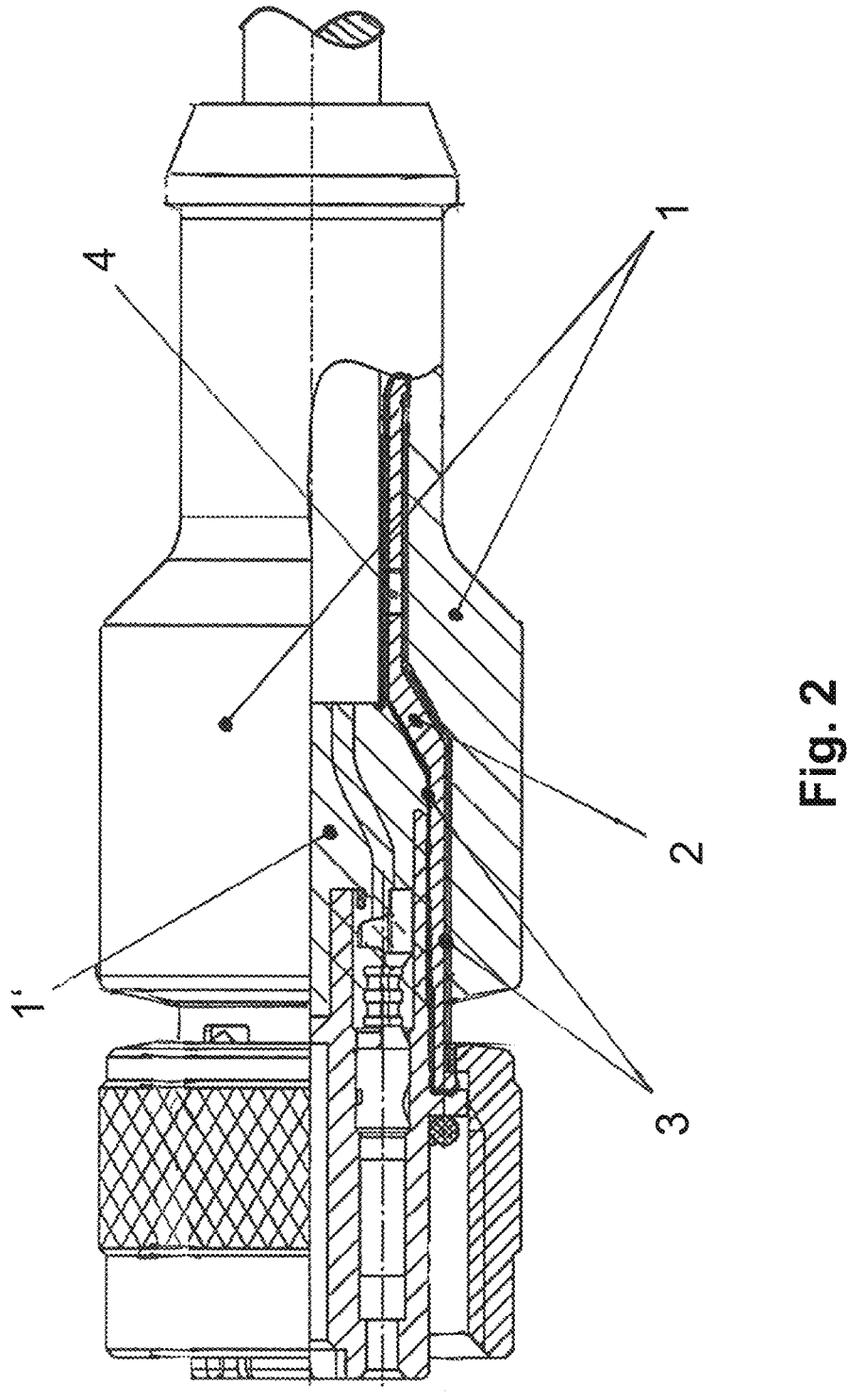
FIG. 2 shows a schematic view of the plug connector shown schematically in FIG. 1 in detail.

FIG. 2 shows the same essential features as FIG. 1 on the basis of a plug connector which can be seen in detail, rendering further statements superfluous.

With regard to the teaching according to the disclosure, the following statements relate to examples of the injection-molded encasing with the insulating encapsulation 1. The underlying problem is that, in the case of the sleeves 2 encapsulated with plastic,—in particular in the context of plug connectors, a media-tight connection between the components is difficult to achieve permanently. This is due to the aging process of the materials and different coefficients of thermal expansion, as well as solidification stresses in the plastic.

Photocatalytic and photohydrophilic titanium dioxide layers on the surfaces 3 can be used to produce the following important properties/effects. Cleaning, also with regard to organic contamination, self-sterilization, anti-fogging effect, hydrophilization, gas and liquid cleaning. Photocatalytic self-cleaning is also possible.

The method for producing a media-tight material composite functions, particularly in the case of the process-reliable, media-tight insulating encapsulation 1, by means of plastic injection molding, in particular in a hot spraying method. Furthermore, it can also be used as a cleaning method during emptying, gluing, low-pressure casting, or for other positive substance connections.

The coated metal parts or sleeves 2 can be stored for several years without loss of effectiveness, since the activation by the UV irradiation allows the photochemical effects to be reactivated. In order to pre-treat the surfaces according to the method, it is possible in particular to clean or activate metal parts with titanium dioxide-coated surfaces 3 by means of UV irradiation—photocatalytic combustion or photo-induced hydrophilicity—in particular, at a lesser time interval before encapsulation with the insulating encapsulation 1.

Figure 3:
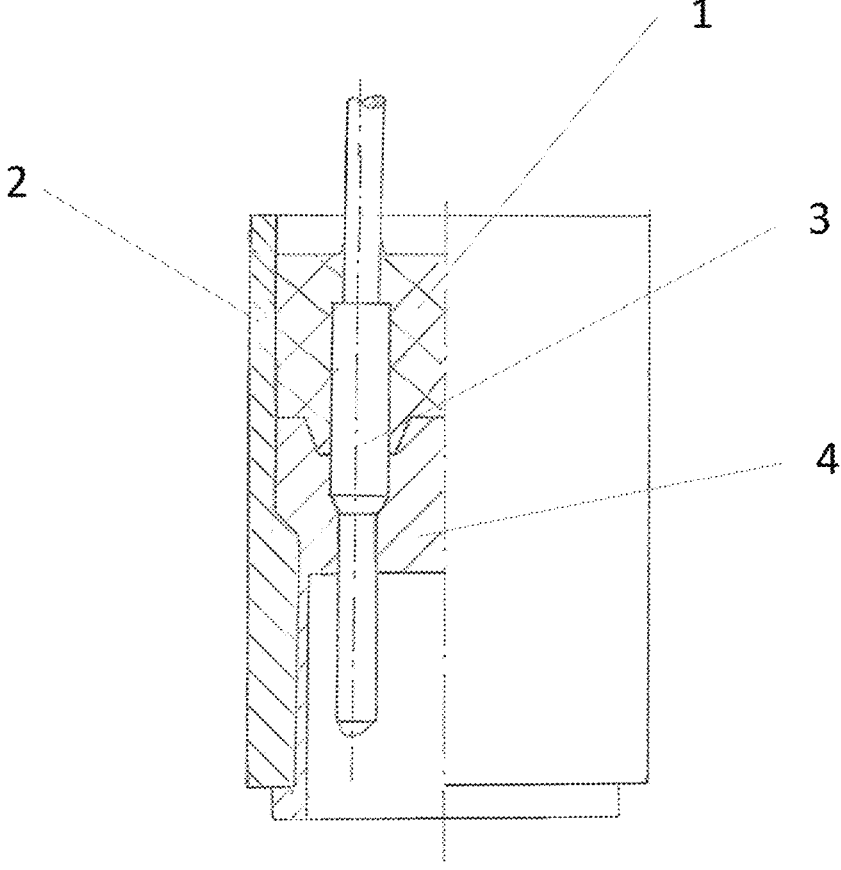
FIG. 3 shows a schematic view of a further exemplary embodiment of a plug connector encased in plastic and having a cast seal.

The arrangement according to FIG. 3 proceeds from the following problem: Gaps can form between the metallic sleeve 2 and the casting compound of the insulating encapsulation 1, or micro cracks can arise at the interface or in the casting compound of the insulating encapsulation 1. To avoid this problem, the pretreatment can be carried out in the manner previously described for the injection molding process.

The UV irradiation takes place from the connection side, i.e., according to FIG. 3, from above, so that the inner photocatalytic surfaces 3 of the sleeve 2 and the connection-side outer surface 3 of the contact region are activated. Even with different coefficients of expansion of the metal of the sleeve 2 and of the plastic of the insulating encapsulation 1, the formation of gaps and the formation of micro cracks can be considerably reduced or prevented.

With regard to other advantageous embodiments of the teaching according to the disclosure, in order to avoid repetition, reference is made to the general part of the description and also to the accompanying claims.

Finally, it is expressly pointed out that the exemplary embodiments of the teaching according to the disclosure described above serve only to explain the claimed teaching, but do not restrict it to the exemplary embodiments.

LIST OF REFERENCE SIGNS

1 Insulating encapsulation
1' Molding
2 Sleeve
3 Surfaces
4 Through-hole

The invention claimed is:

1. A method for producing a media-tight material composite, comprising a metallic sleeve having outer and inner sides and a plastic at least partially surrounding the metallic sleeve, the method comprising:

pretreating surfaces of the metallic sleeve contacted by the plastic by a pretreatment to promote an adhesion of the plastic to the metallic sleeve, wherein the pretreatment is a mechanical and/or chemical and/or physical pretreatment, wherein the metallic sleeve is part of a pre-mounted interface, wherein the metallic sleeve is completely surrounded with a metal surface which has photocatalytic properties, and wherein the metal surface is treated photocatalytically over the entire region of the metallic sleeve at the outer and inner sides, activating the metallic sleeve of the pre-mounted interface by way of UV radiation, and surrounding the metallic sleeve by the plastic.

2. The method according to claim 1, wherein surrounding the metallic sleeve comprises encapsulating the metallic sleeve with the plastic.

3. The method according to claim 1, wherein surrounding the metallic sleeve comprises casting the metallic sleeve with the plastic.

4. The method according to claim 1, wherein surrounding the metallic sleeve comprises encasing the metallic sleeve by sintering with the plastic.

5. The method according to claim 1, wherein the metallic sleeve at least partially has direct contact with the plastic via a contact region, wherein said pretreating surfaces of the metallic sleeve comprises pretreating the contact region.

6. The method according to claim 5, wherein pretreating the contact region comprises cleaning the contact region.

7. The method according to claim 1, wherein the pretreatment improves a wetting between the surfaces of the metallic sleeve and the plastic, resulting from an optimization of an interface energy of the interface.

8. The method according to claim 1, wherein the plastic is an electrically-insulating plastic.

9. The method according to claim 1, wherein the metallic sleeve and the plastic at least partially surrounding the metallic sleeve is a component of an electrical plug.

10. The method according to claim 9, wherein the electrical plug is a shielded electrical plug.

11. The method according to claim 9, wherein the metallic sleeve and the plastic at least partially surrounding the solid body forms a plug sleeve of the electrical plug.

12. The method according to claim 7, wherein the optimization is an optimization of a contact angle between the surfaces of the metallic sleeve and the plastic with respect to a sum of surface energies of the surfaces of the metallic sleeve and the plastic.

* * * * *